United States Patent
Wilson

(10) Patent No.: US 6,607,003 B1
(45) Date of Patent: Aug. 19, 2003

(54) GASKET-LINED RUPTURE PANEL

(75) Inventor: Alan T. Wilson, Broken Arrow, OK (US)

(73) Assignee: Oklahoma Safety Equipment Co,, Broken Arrow, OK (US)

(*) Notice: Subject to any disclaimer, the term of this patent is extended or adjusted under 35 U.S.C. 154(b) by 94 days.

(21) Appl. No.: 09/840,618

(22) Filed: Apr. 23, 2001

(51) Int. Cl.$^7$ ............................................. F16K 17/16
(52) U.S. Cl. ......................... 137/68.23; 137/68.27; 220/89.2
(58) Field of Search .............. 52/1, 98, 99; 137/68.19, 137/68.22, 68.23, 68.25, 68.27, 68.28; 220/89.2, 89.3

(56) References Cited

U.S. PATENT DOCUMENTS

| | | | | |
|---|---|---|---|---|
| 3,091,359 A | * | 5/1963 | Wood | 220/89.2 |
| 3,109,554 A | * | 11/1963 | Porter et al. | 220/89.2 |
| 3,722,734 A | * | 3/1973 | Raidl, Jr. | 137/68.26 |
| 3,972,442 A | * | 8/1976 | Malcolm | 220/89.2 |
| 4,067,154 A | * | 1/1978 | Fike, Jr. | 52/99 |
| 4,498,261 A | * | 2/1985 | Wilson et al. | 220/89.2 |
| 4,612,739 A | * | 9/1986 | Wilson | 137/68.23 |
| 4,662,126 A | * | 5/1987 | Malcolm | 220/89.2 |
| 4,821,909 A | * | 4/1989 | Hibler et al. | 220/89.2 |
| 5,002,088 A | | 3/1991 | Engelhardt et al. | |
| 5,022,424 A | | 6/1991 | Reynolds et al. | |
| 5,036,632 A | | 8/1991 | Short, III et al. | |
| 5,313,194 A | | 5/1994 | Varos | |
| 5,411,158 A | | 5/1995 | Kays et al. | |
| 5,558,114 A | | 9/1996 | Strelow | |
| 5,720,380 A | | 2/1998 | Graham, II | |
| 5,967,170 A | * | 10/1999 | Hume et al. | 137/68.27 |
| 6,367,203 B1 | * | 4/2002 | Graham et al. | 220/89.2 |

* cited by examiner

*Primary Examiner*—Michael Powell Buiz
*Assistant Examiner*—Ramesh Krishnamurthy
(74) *Attorney, Agent, or Firm*—Fellers, Snider, Blankenship, Bailey & Tippens, P.C.

(57) ABSTRACT

There is provided herein an improved rupture panel or disk that consists of a sheet metal top section with a relatively thick polymer foam seal attached thereto. In the preferred arrangement the instant invention does not require a separate support member. The foam sealing component is preferably attached to the top section by some sort of adhesive to hold it in place and it is installed on the process side of the top section. Additionally, the sealing member is preferably of a thickness which is substantially thicker than would typically be used in a conventional rupture panel arrangement. In another preferred embodiment the sealing member is also designed to function as a gasket, thereby eliminating the need for that separate member.

23 Claims, 3 Drawing Sheets

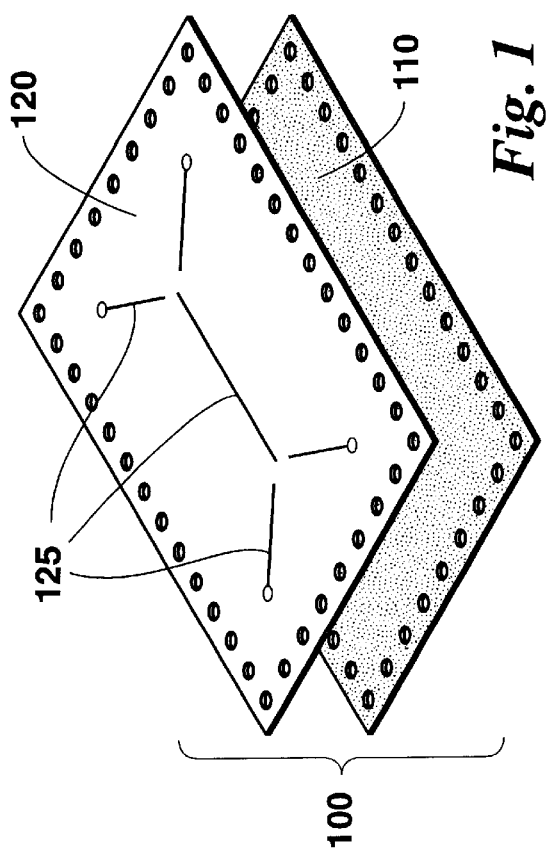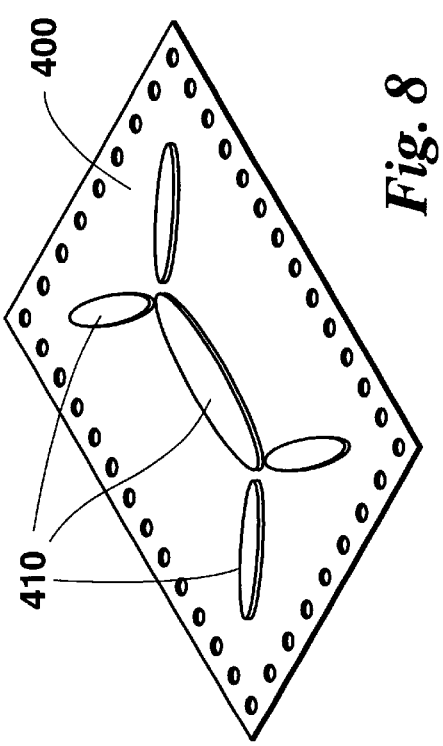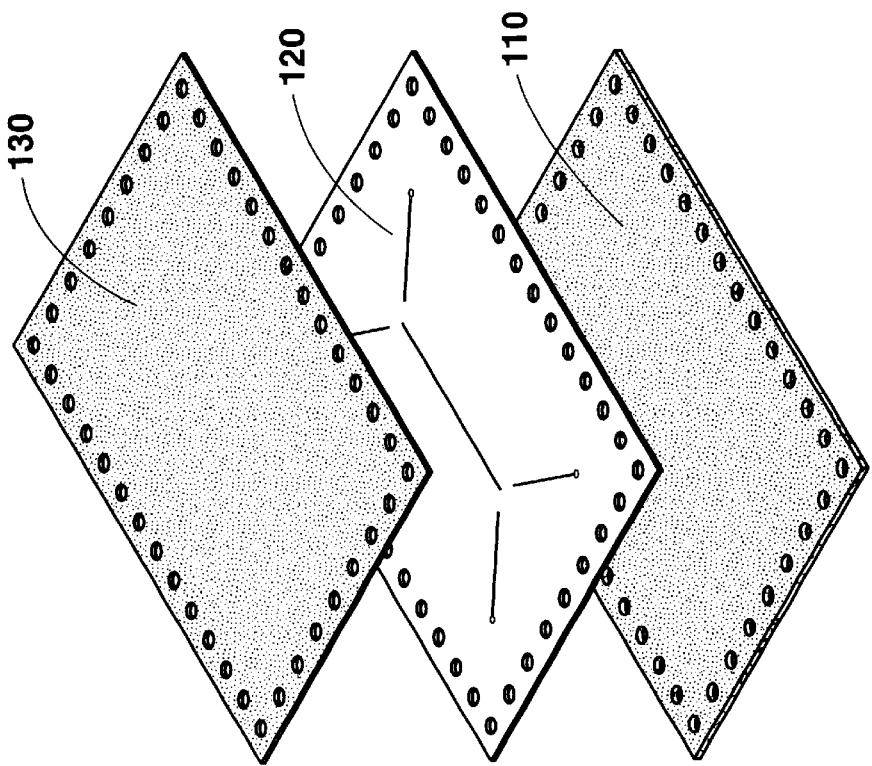

GASKET-LINED RUPTURE PANEL

The present invention relates to the general subject matter of pressure relief devices and, more particularly, to rupture disks and rupture panels.

BACKGROUND OF THE INVENTION

A rupture disk is a pressure relief device that is designed to fail by bursting at a predetermined pressure and temperature. In broad terms, a rupture disk may be thought of as a "fuse" that is adapted for use with fluids under pressure, where "fluid" should be broadly interpreted to include gases and granular materials (such as grains, wood chips, etc.). In a typical application, the rupture disk is installed as part of a pressure vessel or network of pipes which contain fluid. When the pressure within the system exceeds certain predefined limits, the attached rupture disk fails and "bursts" open, thereby providing a passageway through which pressurized fluid can flow out of the system. Of course, bursting of the rupture disk—and the resulting removal of fluid from the system—will have the general effect of reducing the internal pressure within the pipes and devices in the system, thereby reducing the risk of a catastrophic failure. General information related to the general field of rupture disks can be found in U.S. Pat. Nos. 5,002,088, 5,558,114, 5,720,380, and 5,411,158, the disclosures of which are incorporated herein by reference.

Each rupture disks is designed to burst at a particular fluid pressure. However, some manufacturing variability is expected and the range of pressures within which a given disk is expected to burst is given by the manufacturer as its "rupture tolerance." The tolerance is often expressed as a percentage of the nominal burst pressure of the disk and might be as low as a few percent or as high as 40 percent or more.

Rupture disks are generally made of a metals such as aluminum or steel, although many variations are available. The operating portion of the disk is usually generally shaped like a hemisphere or dome and is formed of very thin material, with the thickness of the material determining in a general way the pressure at which the disk will burst. (Obviously, other things being equal, the thicker the metal in the dome the more resistant the disk would be to pressure-induced bursting). Rupture disks that have burst must be discarded and cannot be reused.

Rupture disks are available in a wide of variety of configurations, but one of the more popular arrangements involves the use of a rupture disk and holder combination. Depending on the particular rupture disk, when the rupture disk is installed into a system it may be clamped between two thick flanges which are referred to collectively as the rupture disk holder. In a typical configuration, the holder is sized to be bolted within standard ANSI pipe flanges and fit within the bolt circle. Holders are made of a durable material such as carbon steel and they are not discarded when the rupture disk fails, but rather are retained for use with the replacement disk. Holders may be reused indefinitely, but for safety reasons the disks installed therein are normally replaced at least once a year.

Rupture panels are so-called because they usually take the shape of rectangular panels, rather than round disks. Conventionally, rupture panels are offered in two different configurations: flat panels and crowned panels, the later of which is bowed outward. In actuality, they perform the same general function as rupture disks, although at possibility different pressure ranges and in different sized openings. Thus, in the text that follows the terms rupture disk and rupture panel will be used interchangeably to refer to pressure-relieving devices for use on a pressure vessel, pipeline network, etc.

The functional portion of a conventional rupture panel is constructed of three layers: two (usually identical) metal layers (typically made of thin sheets of steel) are separated by a seal made of a thin material such as Dupont's Teflon (TM) fluoropolymer resin product (e.g., Teflon of about 0.005 inches thick would be typical). In the argot of the trade, the panel most distant from the contained fluid is conventionally known as the "top section", the seal is known as the "liner", and the panel nearest the pressurized fluid is known as the "back pressure support" (or "vacuum support"). The vacuum support member is so-called because it is designed to support the liner when the pressure in the vessel goes below the pressure outside of the vessel and the normally outward directed forces are reversed.

In a typical configuration, a pattern of slits is systematically cut into both of the rupture panel metal layers to weaken them to the point where they will fail together at approximately a predetermine fluid pressure. Although this arrangement does allow a panel or disk to be manufactured that fails at a designated over pressure, it has the general disadvantage introducing holes into the panel that can leak fluid therethrough.

Of course, and as is well know to those of ordinary skill in the art, the function of the liner is to contain the fluid so that the slits do not leak. Additionally, the cuts in the panels are covered by "slit covers" or "slot covers", flat strips of metal (e.g., aluminum) that are adhered or welded over the cuts in the panel. This might be done for many reasons, but one of the primary reasons is that this prevents fluid pressure from pushing the thin film seal out through the slits in the panel opposite the pressurized fluid, thereby damaging the seal.

One disadvantage of the conventional two-panel configuration is that it is relatively expensive to build, as it requires the manufacture of two precision-cut panels which must thereafter be carefully assembled.

Additionally, it is conventional to use a separate gasket along with the rupture panel to seal it around its outer perimeter. As is well known to those skilled in the art, it is important to seal the rupture disk where it attaches to the pressurized system to prevent leakage therefrom. In a conventional arrangement, the rupture panel will be equipped with a metal flange or frame to which the gasket is matched. The gasket might be made from a wide range of synthetic materials, including plastics and elastomers. Of course, if the gasket is installed improperly or is defective, leaks can occur and may occasion the need to remove the entire unit and reinstall it at some expense. Additionally, the separate gasket does add some cost to the rupture disk assembly.

Finally, the thin sealing material tends to creep through the slits in the metal top section in response to pressure against it. When this happens, the liner may abrade and leak at pressures below those for which the panel was designed. Additionally, the pressure of the liner on the outer metal section may cause a bulging in that member which can result in an undesired stress on the slots or slits cut therein. This stress may cause that section to deform or to rupture at unpredicted pressures.

Heretofore, as is well known in the pressure relief industry, there has been a need for an invention to address and solve the above-described problems. Accordingly, it should now be recognized, as was recognized by the present inventor, that there exists, and has existed for some time, a very real need for a device that would address and solve the above-described problems.

Before proceeding to a description of the present invention, however, it should be noted and remembered that the description of the invention which follows, together with the accompanying drawings, should not be construed as limiting the invention to the examples (or preferred embodiments) shown and described. This is so because those skilled in the art to which the invention pertains will be able to devise other forms of this invention within the ambit of the appended claims.

SUMMARY OF THE INVENTION

There is provided hereinafter an improved rupture panel or disk that consists of a sheet metal top section with a relatively thick polymer foam sealing liner attached thereto. That is, in the preferred arrangement the instant invention does not require a separate support member. The foam sealing component is preferably attached to the top section by some sort of adhesive to hold it in place and it is installed on the process side of the top section. Additionally, the sealing member is preferably of a thickness which is substantially thicker than would typically be used in a conventional rupture disk arrangement. The preferred thickness and material of this member helps keep it from being pushed through the slits in the top section, which would be a problem with conventional thin-sealing member. Finally, in another preferred embodiment the sealing member is also designed to function as a gasket, thereby eliminating the need for that separate member.

According to another preferred embodiment, there is provided a rupture panel or disk substantially as described above, but wherein a second sealing component—which is preferably also made of polymer foam—is adhered to the other side of the panel top section, thereby creating a "sandwich" of metal surrounded by two, preferably identical, foam sealing members.

The foregoing has outlined in broad terms the more important features of the invention disclosed herein so that the detailed description that follows may be more clearly understood, and so that the contribution of the instant inventor to the art may be better appreciated. The instant invention is not to be limited in its application to the details of the construction and to the arrangements of the components set forth in the following description or illustrated in the drawings. Rather, the invention is capable of other embodiments and of being practiced and carried out in various other ways not specifically enumerated herein. Additionally, the disclosure that follows is intended to apply to all alternatives, modifications and equivalents as may be included within the spirit and scope of the invention as defined by the appended claims. Further, it should be understood that the phraseology and terminology employed herein are for the purpose of description and should not be regarded as limiting, unless the specification specifically so limits the invention. Further objects, features, and advantages of the present invention will be apparent upon examining the accompanying drawings and upon reading the following description of the preferred embodiments.

BRIEF DESCRIPTION OF THE DRAWINGS

FIG. 1 contains an illustration of a first preferred embodiment of the instant invention.

FIG. 2 contains another preferred embodiment of the instant invention.

FIG. 8 illustrates a top section having a plurality of conventional slit covers thereon.

DETAILED DESCRIPTION OF THE PREFERRED EMBODIMENTS

According to a preferred aspect of the instant invention there is provided an improved pressure relief device which is simpler and more reliable than the prior art. Additionally, the preferred embodiment additionally obviates the need for a separate gasket, thereby reducing the cost of the instant embodiment.

Figure 3A:
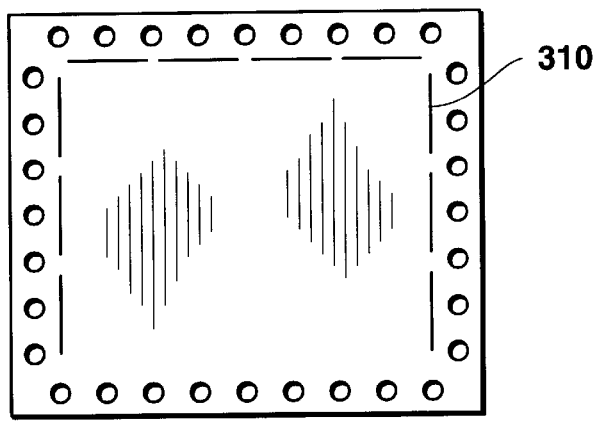
FIGS. 3A, 3B, and 3C illustrate some prior art rupture panels.
Figure 3B:
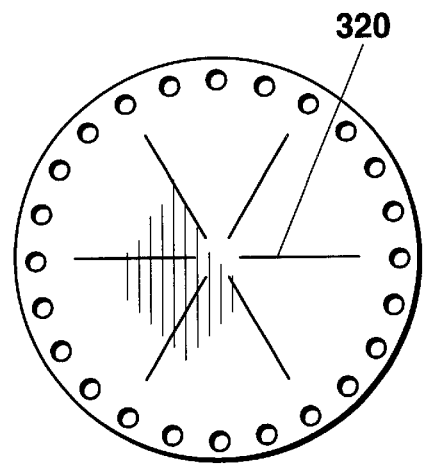
Figure 3C:
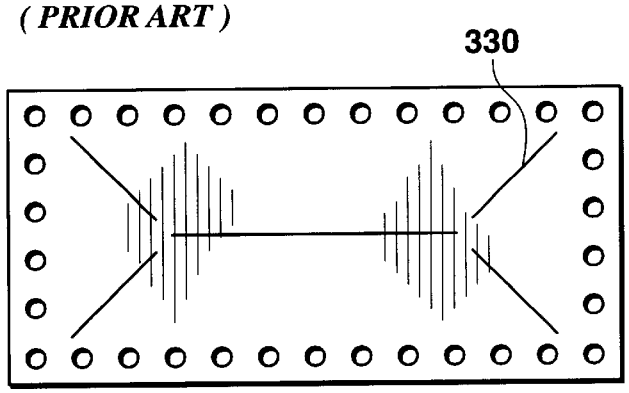

As is generally illustrated in FIG. 3 "rupture panels" are available in a variety of different configurations, including, by way of example, both rectangular (3A and 3C) and circular (3B) forms. Thus, when the term "rupture panel" is used herein, that term should understood to be used in its broadest sense to include any pressure relief device constructed according to the method taught hereinafter, regardless of its shape.

Note that a common feature of such rupture panels are the slits (310, 320, and 330) that are cut into the top section for purposes of weakening the panel so that the stitches (or tabs as they are sometimes called) that remain burst at a predetermined pressure, preferably without shedding pieces of metal into the fluid released thereby. The slit covers that would typically cover such slits have been eliminated for purposes of illustration.

Figure 4:
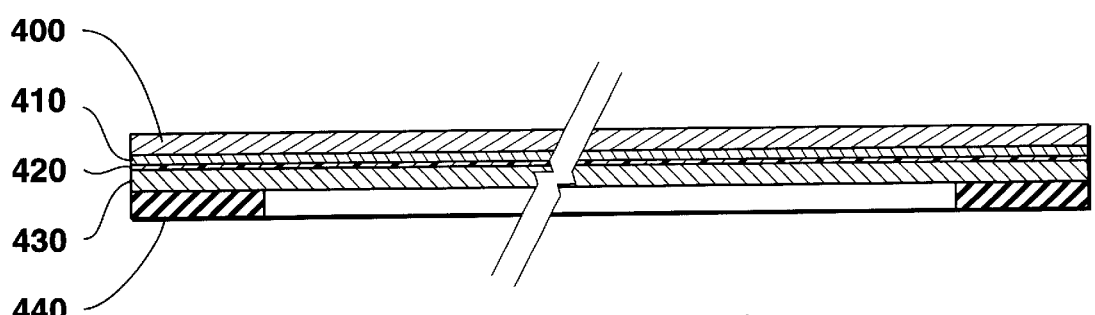
FIG. 4 contains a cross sectional view of a typical prior art rupture panel.

In FIG. 4 is shown an exploded view of a typical prior art rupture panel that illustrates its composition. As is illustrated in that figure, typically such a panel will have a top section 400 which is usually constructed of sheet metal, such as stainless steel, of a thickness appropriate to the application. Often, the metal will be about $\frac{1}{32}$" in thickness or less, although that thickness is strictly given as an example, and top sections might be thicker or thinner than that value depending on the burst pressure that is desired.

A next component of a typical rupture panel are slit covers 410, which are conventionally used to protect the liner 420 from contact with the slits that are cut into the top section 400. That is, the process of cutting the top section 400 can leave ragged edges or burrs which could abrade or cut the prior-art thin liner 420, thereby causing the panel to leak or fail prematurely. Typically, the slit covers 410 will be made of a smooth material such as metal or plastic which has been welded or adhered to the inner side of the top section 400. FIG. 8 illustrates the underside of a typical top section 400 together with slit covers 410 affixed thereto.

A next element of a typical rupture panel is the liner 420, which is conventionally made of a thin polymer film such as Teflon, a typical thickness being about 0.005 inches. As has been discussed previously, the purpose of the liner 420 is to prevent fluid from seeping through the weakening slits that have been placed in the top section 400. Of course, it is important that the liner not leak and be non-reactive to the fluid contained thereby, which may help explain why a thin Teflon sheet has been so popular.

Another component of a typical rupture panel of the sort considered herein is back pressure support 430, which is usually made of sheet metal such as stainless steel. The back pressure support 430 might be cut to match the top section 400 or not depending on the application. What is required, though, is that the back pressure support 430, together with the top section 400, fail at the predetermined pressure.

Finally, as is generally suggested by FIG. 4, a conventional rupture panel will have a gasket 440 associated therewith. The function of the gasket 440 is to seal the flange of the rupture panel to the vessel to which it is attached so that it does not leak around its perimeter.

Turning now to a first preferred embodiment of the instant invention, there is illustrated in FIG. 1 an improved rupture panel 100 which eliminates a number of elements that are necessarily present in the prior art. More specifically, in the preferred embodiment the instant rupture panel 100 consists only of a top section 120 coupled with a relatively thick foam seal 110 which is optimally sized to match the top section 120. The preferred embodiment does not utilize slit covers, back pressure support piece or gasket, which are conventionally required in the prior art.

Choice of the particular parameters of the top section 120 and the slots cut therein will need to be empirically determined for each case. However, such a determination is well within the skill of one of ordinary skill in the art. In the preferred embodiment, though, the top section will be stainless steel of a thickness of about $\frac{1}{32}$" of an inch, although many other variations are certainly possible and have been specifically contemplated by the instant inventor.

Of particular importance for purposes of the instant invention is the use of a relatively thick seal 110 which is preferably positioned on the inside (i.e., pressure side) of the panel 100. In the preferred embodiment, the seal 110 will be made of adhesive backed foam of about $\frac{1}{16}$" in thickness, the function of the adhesive being to affix it to the inside of the top section 120. It is critical that the seal 110 be thick enough—and resilient enough—to resist the pressure that would otherwise tend to force it through the slits 125 in the top section 120. Thus, it is critical that the instant seal 110 be thicker than has heretofore been utilized. Preferably, the seal 110 will be some sort of polymer foam of a sort familiar to those of ordinary skill in the art.

Figure 5:
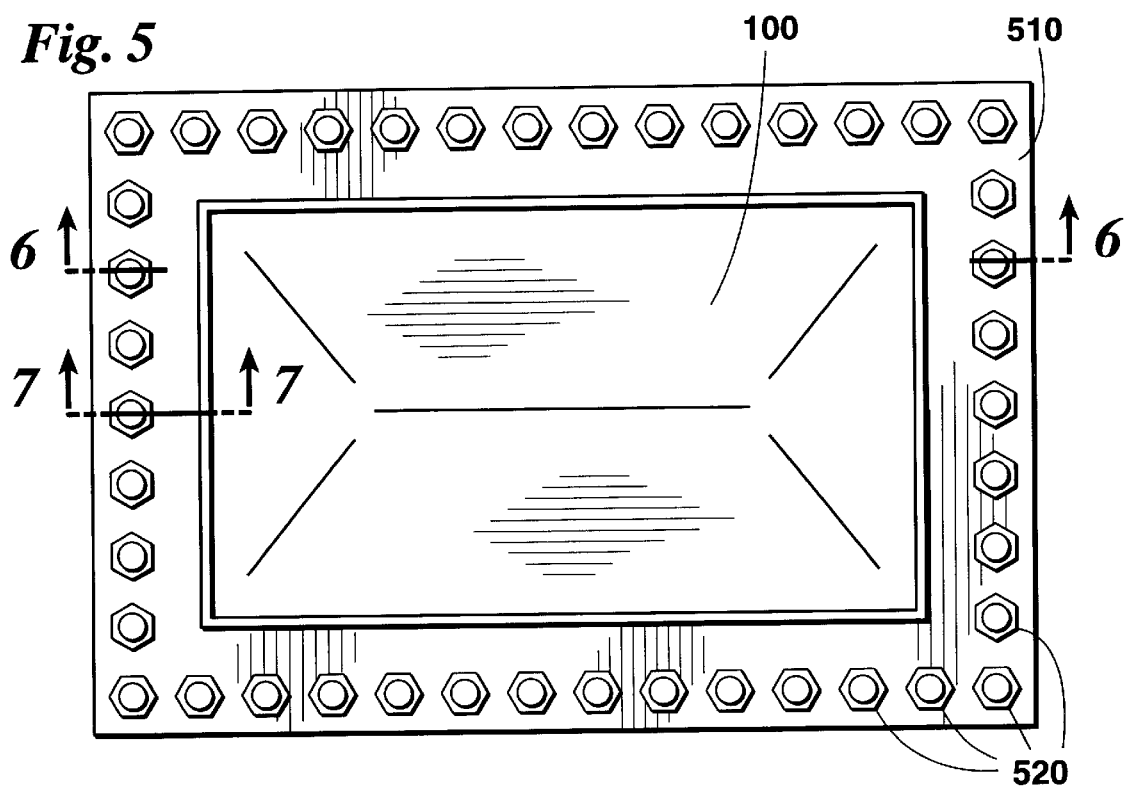
FIG. 5 illustrates a preferred embodiment of the instant invention.
Figure 6:
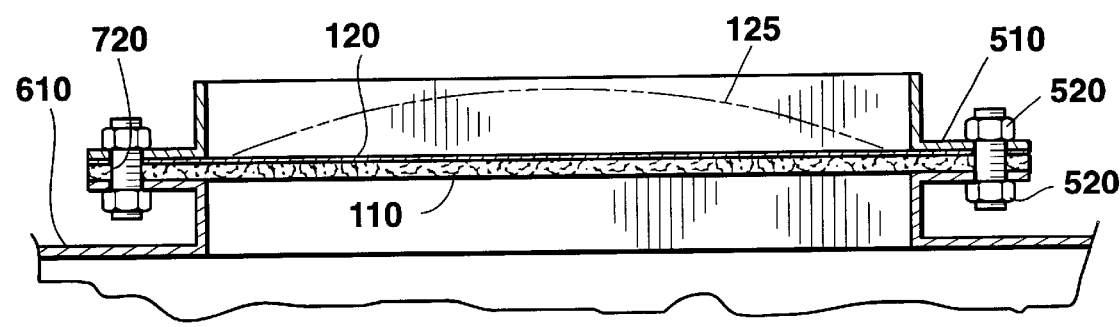
FIG. 6 contains a cross section of the embodiment of FIG. 5.
Figure 7:
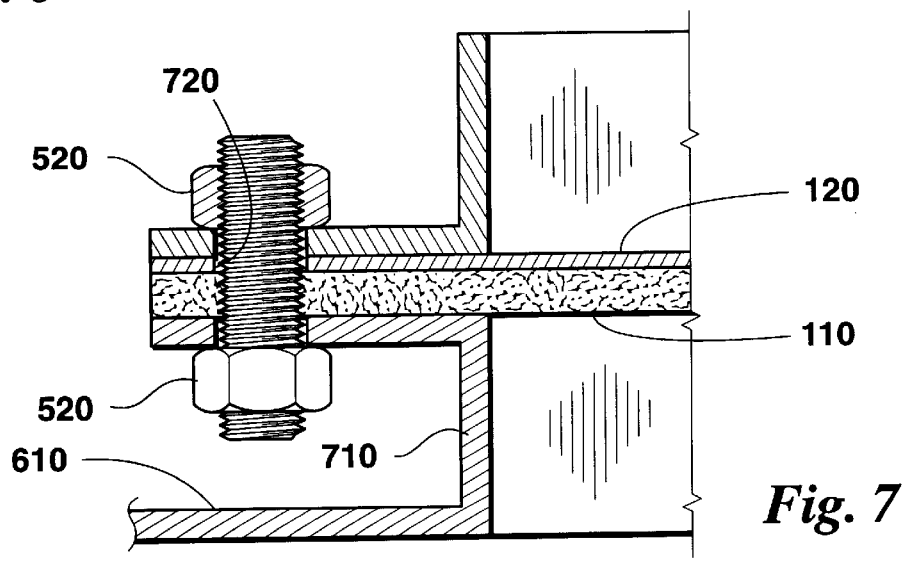
FIG. 7 contains another cross section of the embodiment of FIG. 5.

One further benefit of using the thicker seal 110 of the instant invention is that, provided that this member is extended to the outer periphery of the panel 100, it can also serve as a sealing gasket between the flange of the panel holder and the vessel 610 on which it is installed, thereby eliminating the need for that item. As is generally illustrated in FIGS. 5, 6, and 7, the rupture panel 100 of the instant invention is typically enclosed within holder 510, the periphery of which contains a plurality of fasteners 520 placed therein (each such fastener preferably passing through a fastener aperture 720). As is well known to those of ordinary skill in the art, the function of the holder 510 and fasteners 520 is to threadably secure the rupture panel 100 to the system that it is designed to protect.

As is more clearly illustrated in FIG. 6, the instant embodiment 100 is preferably installed with the seal 110 toward the pressure source. Additionally, when the seal 110 is extended out to the end of the holder 510, it can be seen that it functions to replace the gasket that would otherwise be required. In FIG. 7, note how the outer periphery of the seal 110 is compressed between the flange of the holder 510 and the vessel's mounting bracket 710. In the prior art, a separate gasket (not pictured) would be required to effect this seal. However, in the preferred embodiment the instant seal 110, by virtue of the fact that it is specifically selected to be elastically resilient, can serve both as a top section seal and a gasket.

Finally, it should be noted that, as is illustrated in FIG. 6, the top section 120 may be optionally formed into a domed configuration 625 as is often done in this industry.

According to another preferred embodiment there is provided in FIG. 2 a pressure relief device substantially as described above, but wherein the top section 120 has two foam seals 110 and 130 adhered to it both from above and below. That is, in this preferred embodiment the inner (pressure side) foam seal 110 will be used in conjunction with an outer seal 130 which are both preferably adhered to the top section 120. This embodiment obviously provides additional protection against unexpected vacuum on the process side and further, if that would be desired, could also be extended to the outer periphery of the top section 120 to further supplement the sealing activity of the inner seal 110 against the mounting bracket. Preferably, the outer seal 130 will be about the same thickness and composition as the inner seal 110, however that is not strictly required and it should be clear that the type of material used and its precise thickness could be varied to suit the circumstances.

CONCLUSIONS

In summary, the instant disclosure has been directed to a pressure relief device that requires fewer parts and, hence, can be manufactured less expensively and operated more reliably than has heretofore been possible. The device of the instant invention can be provided in a variety of different shapes, sizes, and pressure ranges to suit the particular needs of an end user. Thus, the disclosure should not be limited in scope to the specific geometries illustrated herein, all of which are only offered as examples of the sorts of pressure relief devices that could be utilized.

Further, it should be noted and remembered that, although the instant invention preferably utilizes a closed-cell polymer foam as a seal, those skilled in the art will recognize that many materials could be used in the alternative such as plasticized elastomers or other thick hermetic materials including weak elastomers such as buna or neopreme, whether or not they have been "foamed." Additionally, multi-layer/multi-component seals could be utilized, which consist of several layers of sealing material, possible of different types. However, it is critical that, whatever the material that is selected for use, that it be leak tight (with respect to the contained fluid) and nonreactive. Further, the seal, whatever its composition, must be at least somewhat flexible and thick enough so that the burrs cannot readily penetrate therethrough or abrade it Additionally, if the seal is to be extended to the periphery of the top section so as to function as a gasket for the rupture panel, it is further important that the seal be compressible and resilient so that the fluid contained thereby is kept from seeping around the edges of the rupture panel. Finally, it is preferable, though not required, that the material that is used to seal the top section affect the top section burst pressure as little as is possible and that the seal itself does not burst at a pressure higher than that of the top section burst pressure. Of course, those skilled in the art will recognize that the sealing layer's effect on burst pressure could certainly be taken into account in designing the rupture panel, and the top section weakened accordingly. Thus, for purposes of the instant disclosure when the terms "foam" and "foam seal" are used hereinafter, that those terms should be broadly construed to include sealing materials, whatever their composition, that have the above-identified properties.

Still further, although the preferred embodiment shows the seal material as being of the same general dimension as those of the top section to which it is attached, those skilled in the art will recognize that that is not an absolute requirement. In more particular, at minimum the seal must be extended to cover any slits that have been placed in the top section. However, the seal itself need not be continuously extended in a single piece but could instead be affixed, preferably via adhesion, to the top section directly over each of the slits. Similarly, although this would not be preferred, in the event that each slit is separately covered, it would be possible to then affix a separate region of the seal material around the periphery of the top section to act as a gasket.

Additionally, although it is not necessary that the slits in the rupture panel be protected by slit covers, that is certainly an option within the scope of the instant invention. In more particular, in one preferred embodiment of the instant invention slit covers are used along with the preferred seal material, although they would not normally be necessary.

Further, and as has been mentioned previously, although the instant disclosure speaks of "rupture panels" that was done for purposes of specificity and not out of any intent to limit the instant invention to that sole embodiment. Indeed, when that term is used herein it should be interpreted in its broadest sense to include any pressure relief device whether manufactured in the form of a panel, a disk, a vent, or otherwise, which is designed to fail or open at a predetermined pressure.

Finally, although the preferred embodiment of the instant invention utilizes a rigid metal holder 510 to attach it to a pressure vessel, it should be noted that the instant invention also is suitable for use in applications wherein use of such a holder is not an option. By way of example, in some cases rupture panels must be installed on pressure chambers which do not have a flat surface which is located in a place that would be suitable for the installation (consider the problem of installing a rupture panel on a pressure vessel that takes the form of an upright cylinder, wherein the panel must be installed on a vertical surface near its base). In cases like this, and in other cases where it is just preferable not to use a holder, the instant embodiment can be used without a holder by bolting it directly onto the vessel using the holes that are preferably provided in its perimeter. Further, because the instant invention when used without a holder is relatively flexible, it can be adapted to fit closely to (and conform to) a curved surfaces such as that described previously.

While the inventive device has been described and illustrated herein by reference to certain preferred embodiments in relation to the drawings attached hereto, various changes and further modifications, apart from those shown or suggested herein, may be made therein by those skilled in the art, without departing from the spirit of the inventive concept, the scope of which is to be determined by the following claims.

What is claimed is:

1. A pressure relief device for use with a pressure system containing fluid therein, comprising:
    (a) a thin metal top section, said top section having at least one weakening slit penetrating therethrough, said top section having a pressure side, said pressure side being positionable to be in fluid communication with said pressure system; and,
    (b) a foam seal affixed to said top section on said pressure side of said top section, said foam seal covering all of said at least one slits, thereby preventing the flow of fluid therethrough.

2. A pressure relief device according to claim 1, wherein said pressure relief device has a peripheral flange integrally formed therein, and further comprising:
    (c) a holder enclosing at least a portion of said peripheral flange of said pressure relief device, said holder including a plurality of fasteners, said fasteners for attaching said holder to said pressure system.

3. A pressure relief device according to claim 1, wherein said metal top section is made of stainless steel.

4. A pressure relief device according to claim 1, wherein said foam seal is about 1/16" inch thick.

5. A pressure relief device according to claim 2, wherein said foam seal continuously extends from said at least one slit to an outer periphery of said peripheral flange of said pressure relief device.

6. A pressure relief device according to claim 5, wherein said foam seal operates as a gasket between said peripheral flange and said holder.

7. A pressure relief device according to claim 1, wherein said top section does not have slit covers between said top section pressure side and said foam seal.

8. A pressure relief device according to claim 1, wherein said pressure relief device is a rupture panel.

9. A pressure relief device for use with a system containing fluid therein, comprising:
    (a) a metal top section, said metal top section having at least one weakening slit placed therethrough, said top section having a process side, said process side being positionable to face said fluid in said system; and,
    (b) a foam seal adhered to said top section on said process side of said top section, said foam seal covering all of said at least one slits,
       wherein said foam seal is for preventing said fluid from passing though said at least one slits, and,
       wherein at least one-of said at least one slits does not have a slit cover positioned between said slit and said seal.

10. A pressure relief device according to claim 9, wherein said metal top section is made of stainless steel.

11. A pressure relief device according to claim 9, wherein said foam seal is made of closed cell foam.

12. A pressure relief device according to claim 11, wherein said foam seal continuously extends from said at least one slit to cover substantially all of said peripheral flange on said process side of said pressure relief device.

13. A pressure relief device according to claim 12, wherein said foam seal operates as a gasket between said peripheral flange of said pressure relief device and said holder.

14. A pressure relief device according to claim 9, wherein said pressure relief device is a rupture panel.

15. A pressure relief device according to claim 9, further comprising:
    (c) a second seal adhered to said top section on said side of said top section opposite said process side, said seal covering at least one of said at least one slits,
       wherein said seal is for further preventing said fluid from passing though any slits so covered.

16. A pressure relief device for use with a pressure system containing fluid therein, comprising:
    (a) a thin metal top section, said top section having at least one weakening slit penetrating therethrough, said top section having a pressure side, said pressure side being positionable to be in fluid communication with said pressure system; and, (b) a foam seal affixed to said top section on said pressure side of said top section, said foam seal covering at least one of said at least one weakening slits, thereby preventing the flow of fluid therethrough.

17. A pressure relief device according to claim 16, wherein said pressure relief device has a peripheral flange integral thereto, and further comprising:

(c) a holder enclosing at least a portion of said peripheral flange of said pressure relief device, said holder for attaching said pressure relief device to said pressure system.

18. A pressure relief device according to claim 16, wherein said metal top section is made of stainless steel.

19. A pressure relief device according to claim 17, wherein said foam seal is about 1/16" inch thick.

20. A pressure relief device according to claim 17, wherein said foam seal extends continuously from at least one of said at least one covered slits to cover said peripheral flange on said pressure side of said pressure relief device.

21. A pressure relief device according to claim 20, wherein said foam seal operates as a gasket between said peripheral flange and said holder.

22. A pressure relief device according to claim 17, wherein said top section does not have slit covers between said top section pressure side and said foam seal.

23. A pressure relief device according to claim 17, wherein said pressure relief device is a rupture panel.

* * * * *